United States Patent [19]

Kauffman et al.

[11] Patent Number: 5,003,591

[45] Date of Patent: Mar. 26, 1991

[54] FUNCTIONALLY MODIFIABLE CABLE TELEVISION CONVERTER SYSTEM

[75] Inventors: Marc W. Kauffman, Cheltenham, Pa.; Michael R. Miller, Moorestown, N.J.

[73] Assignee: General Instrument Corporation, New York, N.Y.

[21] Appl. No.: 357,174

[22] Filed: May 25, 1989

[51] Int. Cl.$^5$ ............................................. H04N 7/167
[52] U.S. Cl. ....................................... 380/10; 380/50; 358/84; 358/86; 455/4; 455/5; 455/6
[58] Field of Search .................... 358/86, 84; 455/3, 6, 455/4, 5

[56] References Cited

U.S. PATENT DOCUMENTS

| | | | |
|---|---|---|---|
| 4,051,326 | 9/1977 | Badagnani et al. | 379/96 |
| 4,054,911 | 10/1977 | Fletcher et al. | 358/141 |
| 4,623,920 | 11/1986 | Dufresne et al. | 380/20 |
| 4,638,356 | 1/1987 | Frezza | 380/7 |
| 4,710,955 | 12/1987 | Kauffman | 380/10 |
| 4,712,239 | 12/1987 | Frezza et al. | 380/20 |
| 4,792,972 | 12/1988 | Cook, Jr. | 380/20 |

OTHER PUBLICATIONS

Rudolf F. Graf, *Dictionary of Electronics*, (Sams and Co., Indianapolis; 1972; p. 220—"Firmware").
John D. Lenk, *Handbook of Microprocessors, Microcomputers, and Minicoputers;* (Prentice-Hall; Englewood Cliffs, N.J.; p. 40).

*Primary Examiner*—Stephen C. Buczinski
*Assistant Examiner*—Bernarr Earl Gregory
*Attorney, Agent, or Firm*—Barry R. Lipsitz

[57] ABSTRACT

A cable television converter with remotely modifiable functionality receives firmware downloaded over a cable television network. The integrity of the firmware is verified, and if valid, the firmware is executed to provide one or more converter functions. If the firmware is invalid, default operation software contained in ROM is executed instead of the firmware to return the converter to baseline operation. In one embodiment, the converter includes a frequency agile data receiver to receive control instructions on a first data channel and firmware on a second data channel. The receiver is forced back to the first channel if a successful firmware download does not occur on the second channel within a predetermined time period. The firmware is continuously transmitted in short segments, and the converter can continue to receive segments until all the segments of a designated firmware package have been successfully downloaded, unless the predetermined time limit expires sooner.

53 Claims, 5 Drawing Sheets

FUNCTIONALLY MODIFIABLE CABLE TELEVISION CONVERTER SYSTEM

BACKGROUND OF THE INVENTION

The present invention relates to cable television apparatus, and more particularly to a converter with remotely modifiable functionality provided by downloadable firmware.

As will be apparent from the following specification, the term "firmware" is used herein to describe functional operating software that is downloaded to a converter or other device and stored in nonvolatile memory. Until the downloaded "firmware" is changed, it resides in hardware (i.e., nonvolatile memory) just like conventional firmware. This concept of downloaded "firmware" is intended to emphasize that the present invention provides modifiable functionality in systems that heretofore could not be modified due to their reliance on permanent firmware.

Cable television converters are currently available that allow a cable system operator to remotely control subscriber service authorizations from a central "headend" site. These units, which are commonly referred to as "addressable converters", allow the cable system operator to control access to various premium services by sending a control signal from the headend to individual converters located at subscribers' homes. The authorization signals are carried on the cable television system, and enable individual subscribers to view programs that they pay an additional fee for. In operation, the control signals typically enable the converter to descramble the premium channels for viewing by the subscriber.

Other addressable systems currently available allow a limited set of operational parameters to be downloaded to a converter from the headend. Such operational parameters include, for example, information that maps displayed channels to tuned channels, time-out periods, barker channel(s), the converter output channel, the terminal configuration, and enable/disable functions for subscriber features such as remote hand-held control, parental control, favorite channel recall, volume control, and the like. The current state of the art is to download configuration information for a set of features that have been predetermined at the time of manufacture or installation of the cable television converter. An example of such a converter is the Model DPV7200 addressable converter manufactured by the Jerrold Division of General Instrument Corporation, Hatboro, Penna., U.S.A.

Other systems with downloadable data capabilities are also known. U.S. Pat. No. 4,054,911 to Fletcher, et al. relates to an information retrieval system capable of capturing packets or rows of video displayable data and/or control program instructions from data continuously transmitted in a common predetermined format. In the system disclosed in the patent, a user decides what information is to be retrieved, and takes action to cause a terminal to retrieve that information. Although a user can vary the function of the terminal by capturing different transmitted data, it is the user that determines what video displayable information is to be received, and how the terminal which receives this information is to process it. There is no disclosure or provision of means to enable a system operator to establish the functional operation of individual terminals on a multi-terminal network.

In commonly owned U.S. Pat. No. 4,712,239 to Frezza, et al. entitled "Security Arrangement for Downloadable Cable Television Converters", incorporated herein by reference, a downloadable converter is disclosed that prevents a false booter image from being downloaded. A false image could subject the system to various integrity problems, such as enabling an unauthorized user to view premium programs. In the patented system, a booter image is received on one channel and a checksum is computed therefrom. A valid checksum, extracted from tag data transmitted on a separate channel and associated with a scrambled program signal, is compared with the computed checksum. If the checksums do not match, a descrambler in the converter is precluded from descrambling the program signal. The system disclosed in this patent downloads all of the operating software to a cable television converter over a dedicated "booter channel", to which the converter is force tuned when first turned on. After the download is complete, the converter's data receiver is returned to the regular data channel, where it remains until the converter is turned off.

It would be advantageous to provide a method and system for downloading firmware to a remote terminal, such as a cable television converter, to allow modification of virtually any or all firmware functions of the terminal by the system operator. It would be further advantageous for such a method and system to enable the system operator to replace or modify options that were predetermined at the time of manufacture or installation of the terminal. By effecting terminal modifications automatically from a headend location, such a method and system would eliminate the need for a technician to travel to a subscriber's home to modify or physically replace a subscriber's terminal to effect such functional modifications.

The present invention provides such a method and system for remotely modifying the functionality of a cable television converter or other terminal.

SUMMARY OF THE INVENTION

In accordance with the present invention, a cable television converter with remotely modifiable functionality is provided. The converter includes means for receiving firmware downloaded over a cable television network, and means coupled to the receiving means for storing the firmware. Means are provided for verifying the integrity of the firmware, and processor means coupled to the storing means accesses and executes the firmware to provide one or more converter functions dictated by the firmware. Nonvolatile memory means are coupled to the processor means for storing default operation software for the converter. Means responsive to the verifying means cause the processor means to execute the default operation software, instead of the downloaded firmware, in the event the integrity of the firmware is not verified.

Data receiving means may be provided for obtaining instructions downloaded over a cable television network. Downloaded firmware is received and stored by the converter only in response to specific instructions received by the data receiving means.

The firmware receiving means and data receiving means can comprise a frequency agile data receiver, together with means for selectively tuning the receiver, to receive instructions on a first channel and downloaded firmware on a second channel. Timer means return the receiver to the first channel if the receiver has been tuned to the second channel for a predetermined time period. The predetermined time period may be specified in instructions received on said first channel, and the length of the time period may be dependent on an amount of firmware to be received. In this manner, a converter will not become stuck on the second channel by error, and be rendered unable to receive further instructions on the first channel.

The downloaded firmware received and stored by the converter can implement a functional layout on a keyboard associated with the converter. Firmware can also implement a feedback function, such as an LED (light-emitting-diode) display or on-screen display to assist a user in operating the converter. A control function for a video recorder coupled to the converter can also be implemented by the firmware. Similarly, the firmware can implement a communication protocol for the converter, a descrambling technique for the converter, an on-screen display to be provided by the converter to a television coupled thereto, and/or a user interface to services provided over the cable television network.

In a preferred embodiment of the present invention, firmware is transmitted in an encrypted form, and the instructions contain a key for decrypting the firmware. The firmware may also be received by the converter in a plurality of segments, with the instructions identifying the number of segments to be received for a complete firmware download. Means can be provided for determining if all of the segments have been validly received, and for receiving replacement segments if one or more segments of the firmware have not been validly received. Receipt of firmware can be prevented if the number of segments identified by the instructions is greater than a predetermined limit.

Cable television headend apparatus is provided for downloading firmware to an addressable, remotely modifiable cable television converter. Means are provided for transmitting addressable converter data on a first data channel of a cable television network. Means are provided for transmitting firmware on a second data channel of the cable television network. An address specific to a particular converter is provided in the addressable converter data, which enables specific data to be received by the converter. Instructions are provided in the specific data, to cause the converter to receive firmware transmitted on the second channel.

The cable television headend apparatus can further include means for verifying that firmware downloaded to the converter has been successfully received by the converter. Billing means maintain records of the cable television services each converter on the system is authorized to receive, and the various functions the converter is to have, and can assign a particular firmware package to be downloaded to a particular converter on the basis of the functions specified for that converter.

A method for providing a cable television converter with functions dictated by downloaded firmware is also provided. Converter control data is received from a remote location via a cable television network. A designated firmware package is captured from a set of firmware packages carried on the cable television network, in response to instructions contained in the converter control data. The designated firmware package is stored in a memory provided in the converter, and is executed to provide at least one converter function dictated thereby.

The firmware packages may be carried on the cable television network in encrypted form, and decrypted using a key contained in the converter control data. In one embodiment, the converter control data is received on a first data channel and the firmware packages are captured from a second data channel on the cable television network. The first channel is monitored to receive converter control data, and the second channel is tuned to capture firmware upon receipt of appropriate instructions on the first channel. Reception is returned to the first channel after the firmware is captured. If the firmware has not been captured within a predetermined time period, reception switches back to the first channel from the second channel.

Also in accordance with the present invention, a remotely modifiable user terminal is provided which comprises means for receiving a plurality of cyclically transmitted firmware segments, the segments together comprising a firmware package. Means coupled to the receiving means verify each segment upon receipt thereof, and means are provided for storing each verified segment. A determination is made as to whether a complete firmware package has been stored in the storing means at the completion of a firmware transmission cycle. If not, then reception, verification, and storage of transmitted firmware segments continues during a subsequent firmware transmission cycle. Reception of the firmware segments is terminated upon a finding that a complete firmware package has been stored. Means can further be provided for precluding the execution of firmware segments until a complete firmware package has been stored.

The verifying means can operate by testing a checksum for each firmware segment as it is received. The terminal may further comprise means for maintaining a record of the proper checksum for each segment, and means for periodically retesting the checksums after a complete firmware package has been stored. Default operation software may be stored for the terminal, and executed if the checksums are not verified upon retesting. The complete firmware package may also be verified after it has been stored, and the default operation software executed if the complete firmware package is not valid. The default operation software may also be executed if reception of firmware segments is not completed during a predetermined time period.

A complete firmware package may include a plurality of modules. Execution of fewer than all of the modules may be precluded as an additional security feature.

DETAILED DESCRIPTION OF THE INVENTION

Figure 1:
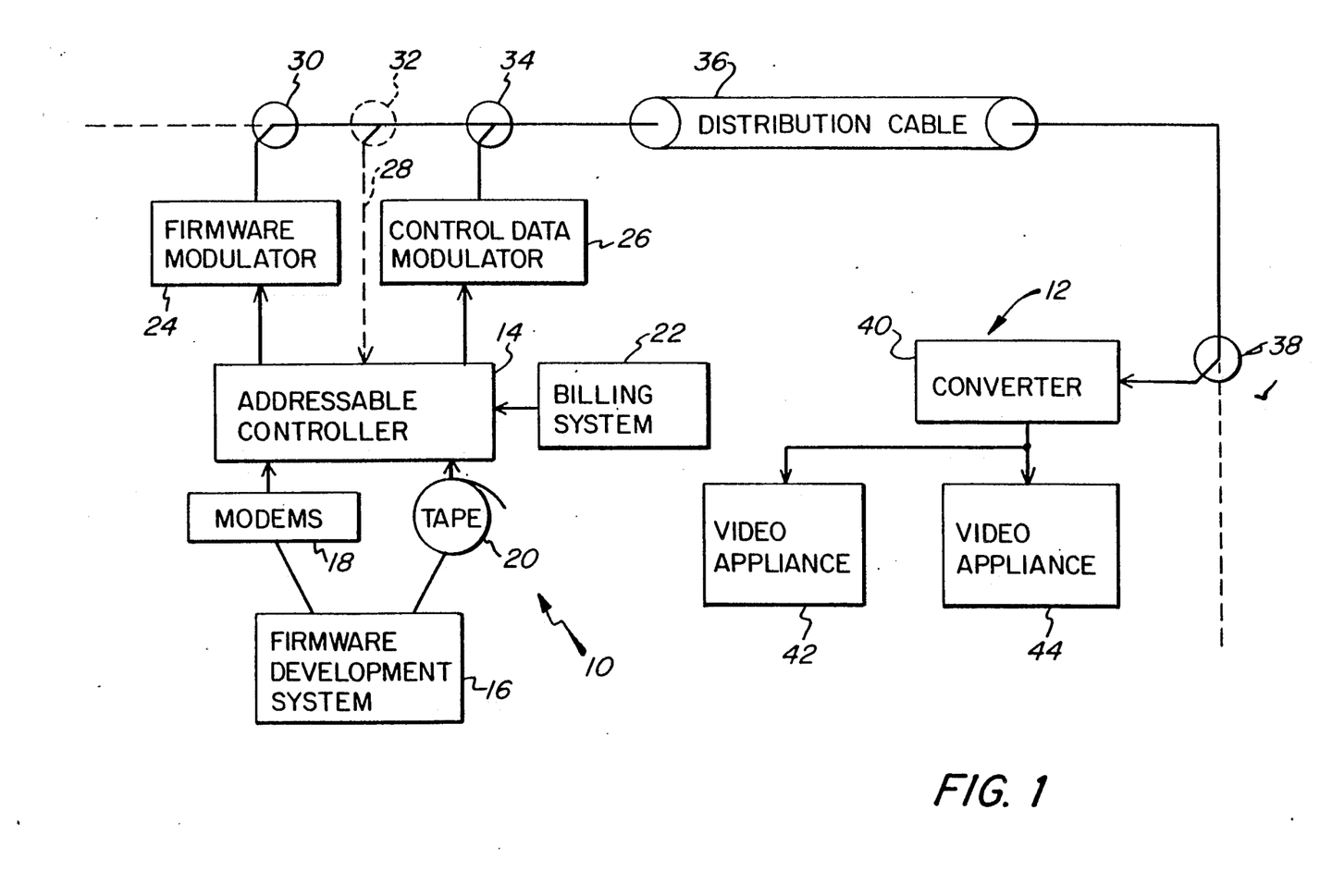
FIG. 1 is a block diagram of a functionally modifiable cable television converter system in accordance with the present invention.

Turning to FIG. 1, a cable television system is depicted having headend components, generally designated 10 and subscriber components, generally designated 12. The headend communicates with the subscriber via a distribution cable 36. A firmware development system 16 is used to create new functional firmware packages for subscriber terminals, such as converter 40. Firmware development system 16 may be physically located at the headend, but is more typically located at the facilities of a vendor which develops new firmware programs for sale to a cable system operator. New firmware packages may be transferred to an addressable controller 14 located at the headend by magnetic tape 20 which is read by addressable controller 14, or by communication between the firmware development system 16 and addressable controller 14 via direct connection or modems 18 operating over conventional telephone lines. Those skilled in the art will recognize that other means may also be available for transferring firmware from firmware development system 16 to addressable controller 14.

Once firmware is resident in addressable controller 14, it is transmitted repeatedly over a data channel. The data channel may be either the primary addressable data channel provided in a conventional cable television network having addressable converters, or a separate secondary data channel. In either event, the data channel(s) can transmit the data on an FSK modulated FM carrier or by any other suitable transmission scheme well known in the art.

The use of a secondary channel for downloading firmware to converters is illustrated in FIG. 1. Control signals, including data such as converter addresses, program authorization codes, and the like is communicated from addressable controller 14 to a converter 40 via control data modulator 26. The output of control data modulator 26 is coupled to distribution cable 36 via a tap 34, and data is received therefrom by converter 40 via tap 38. The control data modulator transmits the data signals on a primary channel, and in accordance with the present invention, the data includes instructions to converter 40 which cause the converter to receive specified firmware downloaded from addressable controller 14.

In the two channel embodiment illustrated in FIG. 1, the firmware is transmitted on a secondary channel by firmware modulator 24, coupled to the cable network at tap 30. Upon receipt of instructions on the primary channel, converter 40 switches to the secondary channel for receipt of designated firmware. An additional data path 28 may optionally b provided via tap 32 for receipt of data from converter 40 by addressable controller 14. Such data might include, for example, a verification that converter 40 has successfully received a firmware package it has been instructed to receive. The provision of a return path 28, which provides a "two-way" cable communication system, is well known in the art.

Billing system 22 is provided at the headend for maintaining accounting information relating to charges incurred by subscribers on the cable system. In accordance with the present invention, different firmware packages downloaded by headend 10 to converter 40 may provide different converter functions, with higher levels of service providing increased converter functionality. Billing system 22 keeps track of the level of service for each subscriber, and assigns particular firmware packages to subscriber converters on the basis of converter functionality to be provided to each subscriber.

At the subscriber location 12, a subscriber may have one or more video appliances 42, 44 coupled to the output of converter 40. For example, video appliance 42 might be a television set, and video appliance 44 might be a video recorder ("VCR"). In accordance with the present invention, firmware downloaded to converter 40 can provide functions relating to a VCR. An example of such a function is time controlled programming. This function enables the converter to be programmed to make channel changes at various times so that the VCR can record different television programs on different channels automatically and while unattended. Such a function can also enable "impulse pay-per-view" orders to be programmed into the converter by a subscriber, so that special premium programs can be ordered, when the subscriber is not home, and recorded on the subscriber's VCR for later viewing.

Figure 2:
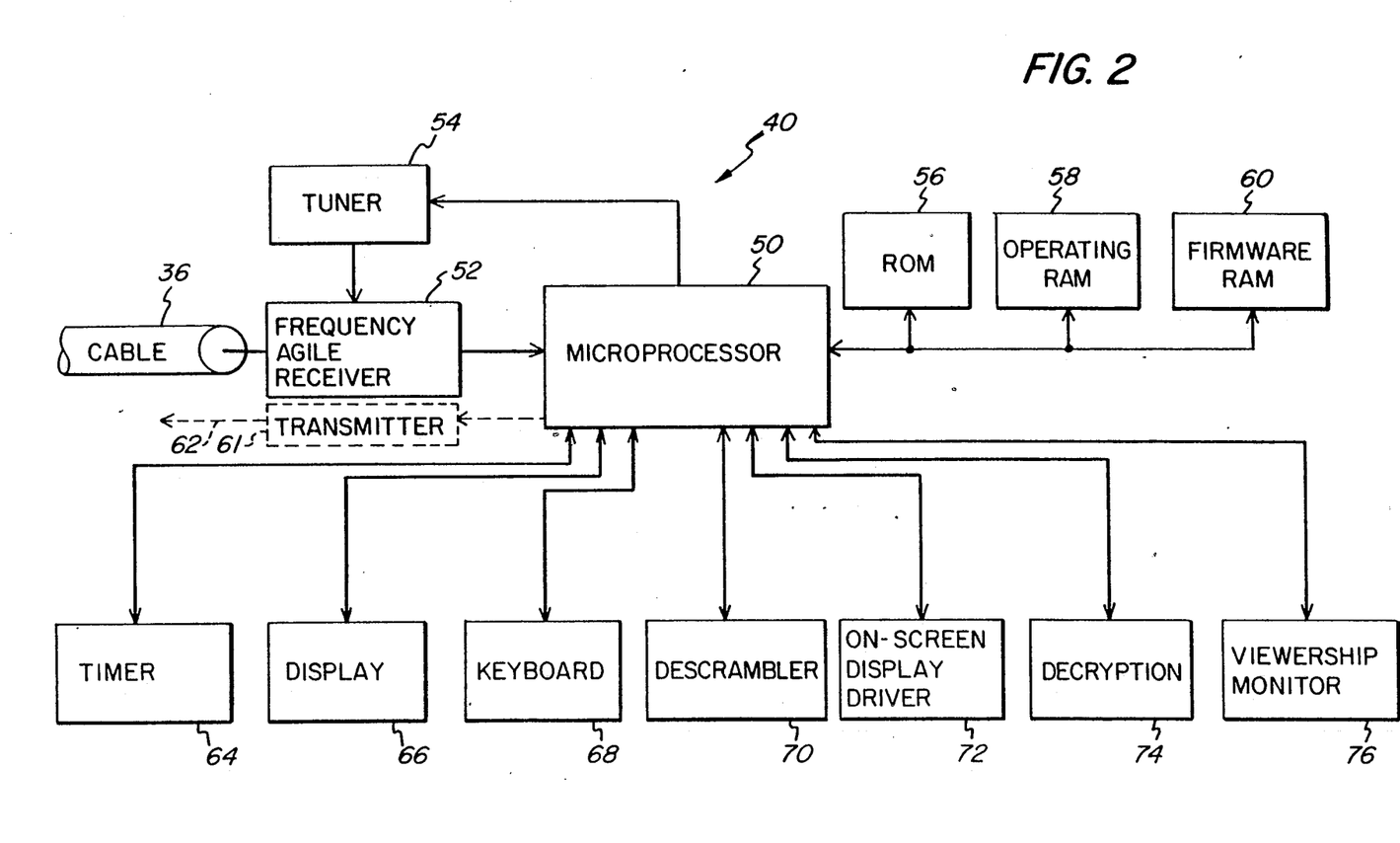
FIG. 2 is a block diagram of the pertinent elements of a converter used in connection with the system of the present invention.

FIG. 2 is a block diagram illustrating the pertinent components in one embodiment of a converter 40 in accordance with the present invention. In the embodiment illustrated, the converter receives addressable data on one data channel and downloaded firmware on another data channel. It is noted that in another embodiment of the invention, both the addressable data and the firmware can be received over a single data channel. Or, the firmware may be carried on some other media, such as the public telephone network.

In the two channel embodiment illustrated in FIG. 2, a microprocessor 50 receives data from cable 36 via a frequency agile receiver 52. A transmitter 61 and return path 62 can be provided from microprocessor 50 back to addressable controller 14 in the event the converter is used with a two-way cable television system. Like receiver 52, transmitter 61 can be frequency agile to enable a choice of return transmission frequencies.

A tuner 54, under the control of microprocessor 50, tunes frequency agile receiver 52 to either a primary channel for receipt of addressable data (e.g., instructions to capture a particular firmware package) or to a secondary channel for the receipt of firmware. Although a single secondary channel is described herein for purposes of illustration, it will be appreciated that any number of such secondary channels can be provided, depending on system requirements. Typically, frequency agile receiver will be tuned to the primary channel, and will only switch to the secondary channel upon specific instructions contained in data received on the first channel. In the alternate embodiment where both addressable data and firmware are received on a single data channel, frequency agile receiver 52 and tuner 54 can be replaced with a fixed frequency data receiver.

The provision of a dedicated secondary data channel as illustrated in FIG. 2 is advantageous. By keeping firmware data off of the primary channel, the data throughput load on this channel is reduced.

In the two channel embodiment, firmware data is broadcast cyclically on the second channel, by addressable controller 14 at the headend. In a preferred embodiment, a plurality of different firmware packages are broadcast on the secondary channel, each package providing different converter functions or combinations of functions. Upon receipt of instructions on the primary channel, microprocessor 50 will cause tuner 54 to switch receiver 52 to the secondary channel for receipt of a designated firmware package.

Various memory devices are coupled to microprocessor 50, including read only memory ("ROM") 56, operating random access memory ("RAM") 58, and nonvolatile firmware RAM 60. ROM 56 contains a program that allows converter 40 to retrieve and execute a downloaded firmware package. Upon receiving the proper command from the addressable controller, the converter aborts any downloaded package currently being executed, accesses the appropriate data channel for receipt of a designated firmware package to be downloaded, and receives and loads the firmware into nonvolatile firmware RAM 60.

ROM 56 also contains default operation software, which is used to restore the converter to a nominal or "baseline" operation if a bad firmware download occurs. As explained below, if an error is detected in the receipt of downloaded firmware, or if the firmware is found to be invalid, the converter is forced to execute only the default operation software stored in ROM 56.

A timer 64 is associated with microprocessor 50 to provide a time-out feature that prevents the converter from getting stuck on the secondary channel, in the event there is a problem receiving specified firmware.

When billing system 22 assigns a new firmware package to a particular converter 40, addressable controller 14 is commanded to transmit instructions to the converter. The instructions are received by microprocessor 50, and include an identifier specifying which firmware package to receive, where to find the firmware package (i.e., on the primary or a specified secondary channel), a predetermined time limit defining how long the converter should attempt to receive the firmware before aborting, a key to use in decrypting the data in the event it is encrypted, and the maximum segment number to be loaded (indicating how many segments are included in the firmware package to be received). While the firmware is being received, timer 64 counts down the time-out period specified in the download command. If the timer expires, microprocessor 50 aborts the download, and returns to the original data channel. The time-out period specified in the download command can be varied depending on the amount of firmware to be downloaded.

Timer 64 is also used in connection with a self-check that is periodically performed by the converter to ensure that the firmware has not changed since the last authorized download. This self-check is a security feature to guard against infiltration of the converter by a "software pirate" who attempts to download unauthorized software to the converter, in an effort to steal services from the cable system.

In accordance with the self-check procedure, timer 64 retests the checksum for each of the firmware segments at regular intervals after the firmware has been downloaded. In the event a checksum is found to be invalid, microprocessor 50 restores the converter to baseline operation by executing the default operation software contained in ROM 56.

Converter 40 contains various other components with functions that can be modified by downloaded firmware. For example, a light-emitting-diode ("LED") display or other display 66 may be provided on the converter to give a user feedback concerning converter operations. Pressing a button on the converter, or its remote control unit, can cause an LED to light, verifying that the button has been pressed or that a function to be activated by the button has occurred. Such a feedback function is useful to assist a user in operating the converter.

The converter also includes a keyboard 68, the functional layout of which can be defined and/or modified by firmware downloaded to the converter. Keyboard 68 may be physically on the converter box, on a remote hand-held unit for the converter, or a separate keyboard can be provided in both places.

Converter 40 also includes a descrambler 70 for descrambling premium programs received via the cable television network. Various descrambling techniques are well known in the art, and different techniques can be implemented by downloading different firmware to the converter.

Another feature that can be provided by converter 40 is the display of information on a user's television set. On-screen display driver 72 is provided for this purpose. An example of such a display is the channel number tuned to, or the current time. In addition, on-screen displays can be used to distribute messages from the cable system operator, e.g., "your account is past due; please send us a check". An electronic mail, or "E-mail" feature can also be provided, enabling a subscriber to send and receive text messages on his television (or other display) via the cable system. The implementation and/or modification of on-screen displays can be provided by firmware downloaded to the converter.

In order to provide a measure of protection against illegal use of the firmware download feature, the firmware is downloaded to the converter in an encrypted form. The data is decrypted at the converter by a decryption module 74. A decryption key is transmitted to the converter from the headend as part of the addressable data instructions that command the converter to receive a particular firmware package. Encryption and decryption schemes are well known in the art. Examples of such schemes are provided in commonly owned U.S. Pat. No. 4,638,356 of William A. Frezza, entitled "Apparatus and Method for Restricting Access to a Communication Network", and U.S. Pat. No. 4,710,955 of Marc W. Kauffman, entitled "Cable Television System with Two-Way Telephone Communication Path". Both of these patents are incorporated herein by reference.

A viewership monitor 76 can be provided in accordance with the present invention to enable a cable system operator to determine what programs and services a subscriber has received using each converter, and/or to retrieve a list of the functions which have been used on each converter. Viewership monitor 76 will monitor the operation of the converter, and store pertinent data relating thereto. By addressing an appropriate command to the converter, the cable system operator will be able to upload the data to the headend for analysis.

Other functions that can be implemented by firmware downloaded to the converter include communication protocols for the converter, and user interfaces to services provided over the cable television network. For example, a user may be provided with the capability to order pay-per-view programs on an impulse basis. The procedure for ordering such programs can be modified through downloadable firmware. Utility meter reading can also be provided, by adding an asynchronous data port to the converter and controlling the retrieval of utility data via downloaded firmware.

Figure 3:
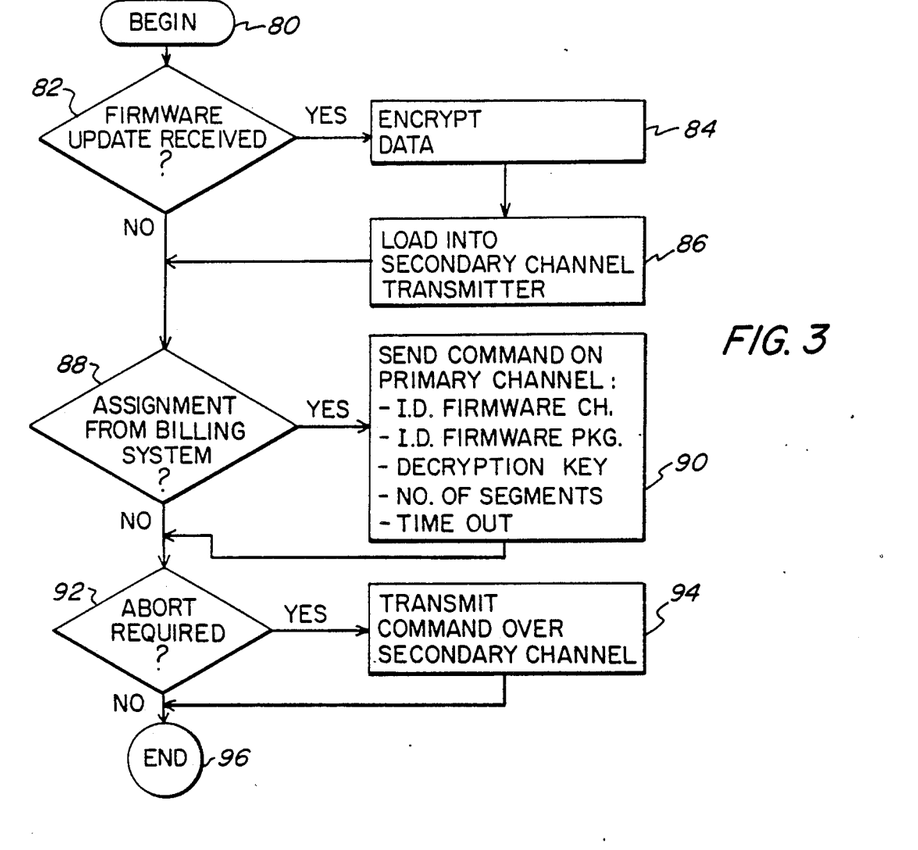
FIG. 3 is a flowchart illustrating steps taken by the headend when it receives a new firmware package or an assignment to download firmware to a converter.

A flowchart illustrating a routine which can be used by the addressable controller in connection with the receipt and downloading of firmware is provided in FIG. 3. The routine begins at box 80, and at box 82 a determination is made as to whether a firmware update has been received from the firmware development system. If so, control passes to box 84 and the new firmware data is encrypted. At box 86, the encrypted data is loaded into the secondary data channel transmitter (firmware modulator 24) and continuously transmitted on the secondary channel together with other firmware packages that can be provided to converters on the system.

At box 88, a determination is made as to whether a new firmware package assignment has been made by billing system 22. If so, addressable controller 14 sends an appropriate command on the primary channel (control data modulator 26) as indicated at box 90. The command is addressed to the particular converter that is to receive the firmware, and identifies the channel the firmware is to be received from, identifies the firmware package to be received, provides the decryption key necessary to decrypt the firmware data, identifies the number of segments which make up the complete firmware package, and sets forth the time-out parameter defining the maximum time the converter should stay tuned to the secondary channel for receipt of the downloaded firmware.

The converter receives the firmware in fixed length "segments", and specific converter models will have specific maximum segment numbers determining the actual maximum size of allowable firmware downloads. In a preferred embodiment, the maximum segment number is a hard-coded parameter. Should an attempt be made to download firmware that exceeds the maximum size, the download will be rejected by the converter. In operation, the converter will ignore the download command and will not switch to the secondary channel if the transmitted maximum segment number parameter exceeds the internal converter maximum.

At box 92 of FIG. 3, a determination is made as to whether an abort of a download is required. This would be the case, for example, if the addressable controller detects a problem with an attempted download. In the event an abort is required, an abort command is transmitted over the secondary channel as indicated at box 94. The converter will then switch back to the primary channel, execute the default operation software to return to a baseline operation, and await a subsequent command from the addressable controller via the primary data channel. At box 96, the routine of FIG. 3 ends. It will be appreciated by those skilled in the art that the routine of FIG. 3 is called on a periodic basis (or can be a continuous loop) to enable new firmware to be received from the firmware development system and to download firmware packages to converters at the command of billing system 22.

Figure 4:
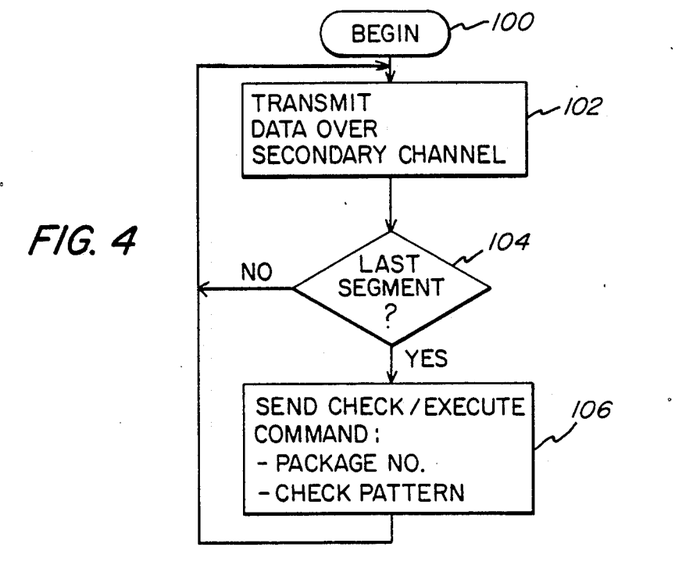
FIG. 4 is a flowchart illustrating the continuous transmission of firmware over a secondary data channel.

FIG. 4 illustrates a routine that the addressable controller can use to continuously transmit firmware data over the secondary channel. The routine commences at box 100, and at box 102 data is transmitted over the secondary channel. At box 104, a determination is made as to whether the last segment of a firmware package has been transmitted. If not, transmission of the remaining segments continues as indicated at box 102. Once the last segment has been transmitted, control passes to box 106 and the addressable controller transmits a check/execute command to the converter(s) that was to receive the firmware package. The check/execute command includes the firmware package number that was to be received, and a check pattern. The check pattern is used to verify the entire download prior to execution. When a check/execute command is received, the converter checks to see if all required segments have been received, and that the check pattern downloaded matches the pattern calculated from the actual downloaded data. If all checks are valid, the converter permits execution of the downloaded code, and returns to the primary data channel. After the check/execute command is sent at box 106 of FIG. 4, control returns to box 102, and continuous transmission of the data proceeds over the secondary channel.

Figure 5:
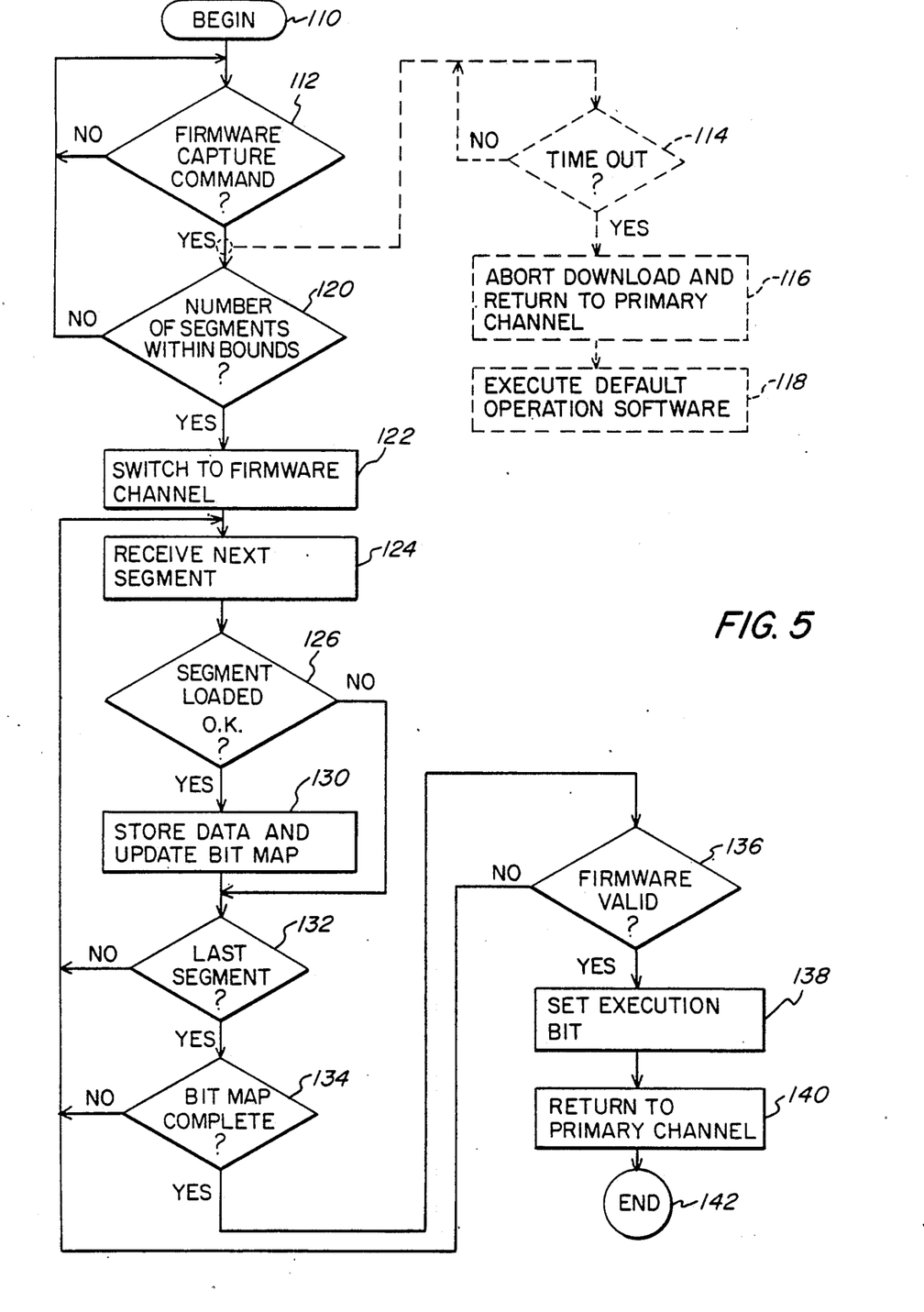
FIG. 5 is a flowchart illustrating the steps taken by a converter in receiving downloaded firmware.

FIG. 5 is a flowchart illustrating the capture of downloaded firmware by a converter. The routine begins at box 110, and control passes to box 112 where a determination is made as to whether a firmware capture command has been sent to the converter. If not, the converter continuously waits for such a command to be received at box 112.

Once a firmware capture command is received, control passes from box 112 to box 120 for the actual capture of the firmware. At the same time, an ancillary time-out process commences as indicated at boxes 114, 116, and 118. A timer counts down the time-out period specified in the firmware capture command. If the time-out period expires before the specified firmware package has been successfully captured, as determined at box 114, control passes to box 116 where the download is aborted and the converter returns to the primary data channel. As indicated at box 118, the default operation software is executed so that the converter can operate in a baseline mode until the appropriate firmware package can be properly downloaded.

As indicated at box 120, before a firmware download commences, a determination is made as to whether the number of segments contained in the firmware package to be downloaded is within bounds. In other words, as noted above, the maximum segment number of the firmware package to be downloaded must not exceed the maximum size allowable for the converter. If the number of segments exceeds the number allowed by the converter, the firmware capture command is ignored and control returns to box 112. Otherwise, the firmware capture proceeds and at box 122, the converter switches to the secondary channel (i.e., the channel on which the firmware is downloaded). At box 124, the segments comprising the firmware package are received. Firmware is continuously broadcast on the secondary data channel in small (e.g., 32 byte) encrypted packets. A converter that has been commanded to accept a new package tunes to the appropriate channel and loads each packet that has the proper version identifier. While loading, the converter keeps track of each segment successfully loaded in an internal segment bit map. As indicated at box 126, a determination is made as to whether a segment has been successfully loaded. This is accomplished by computing a checksum for each segment, and comparing the checksum with one downloaded with the firmware segment. If the checksums match, the converter decrypts the data contained in the segment, stores the data, and sets an appropriate bit in a firmware segment bit map as indicated at box 130. In storing the data, if prior firmware has been stored in the converter, the appropriate segment of the prior firmware is overwritten with the newly received data.

If it is determined at box 126 that a segment has not been properly loaded (i.e., the computed and downloaded checksums do not match), the converter ignores the segment and proceeds directly to box 132. At box 132, a determination is made as to whether the last segment in a firmware package has been received. If not, control returns to box 124 and the procedure continues until all segments are received.

After the last segment has been received, control passes to box 134 which determines if the bit map created at box 130 is complete. If the bit map is not complete, it means that one or more segments were not properly loaded and an attempt to receive these segments will be made during the next transmission cycle of the firmware. In this event, control returns from box 132 to box 124 where an attempt to receive the entire firmware package will again be made.

As is evident from the flowchart of FIG. 5, an incorrectly received segment will not overwrite a previously correctly received segment. All correctly received segments, however, will overwrite previously received segments. In this manner, even if there are errors in the transmission of certain segments during a download cycle, all of the segments should be correctly received after the completion of several complete transmission cycles of a firmware package.

Once all of the segments have been properly received, the bit map will be complete, and box 134 will pass control to box 136. Box 136 responds to the check-/execute command transmitted by the addressable controller at box 106 in FIG. 4. When the check/execute command is received, the converter checks to see if all required segments have been received and that the check pattern downloaded matches a pattern calculated from the actual downloaded data (i.e., the complete firmware package). If the patterns do not match, control returns to box 124 and additional attempts are made to receive the firmware as long as a time-out (box 114) has not occurred.

If the entire firmware package is determined to be valid at box 136, control passes to box 138 and an execution bit is set permitting the firmware to be executed. As an additional level of protection against a software pirate, software contained in the converter's ROM (ROM 56—FIG. 2) can periodically determine if all of the functional modules contained in the firmware package are being executed, and if not, subsequent execution of the firmware can be precluded by turning off a separate, special execution bit maintained by the converter.

At box 140, the downloading of a firmware package is complete, and the converter returns to the primary data channel. The routine ends at box 142.

The firmware download process is a destructive one. Once a converter receives the command to accept a new package, the old downloaded firmware (if any) is effectively deleted and cannot be executed. In the preferred embodiment, partial downloads are not supported, and an entire package must be sent. This further frustrates a software pirate's efforts, and allows a firmware download to be nullified by sending the command to accept a package immediately followed by sending the command to return to the primary data channel.

The various commands sent by the addressable controller to support the firmware download process are:

Accept Firmware Download

Return to Primary Channel
Disallow Downloaded Execution
Load Firmware Segment
Check/Execute Firmware
Send Firmware Check Pattern The "Accept Firmware Download" command is used to initiate the firmware download process. It may be sent to one individual converter or globally to a set of converters that understand a group address. The addressed converter(s) prepares to accept the package number, on the appropriate channel, using the given firmware decryption key and maximum segment number. The firmware download time-out value is also given. Upon reception of this command, the converter goes into its firmware download mode, in which it must not execute any downloaded code.

The "Return to Primary Channel" command is used to force a converter to return to the primary data channel. This command may also be sent in a specific format to an individual converter, or in group format to a set of converters. All converters receiving this command abort the current firmware download, clear their firmware segment bit maps, and exit the firmware download mode.

The "Disallow Downloaded Execution" command explicitly disallows the execution of any downloaded firmware. It may be sent in the specific or group format. All converters receiving this command abort execution of any downloaded firmware, clear their firmware segment bit maps, exit firmware download mode, and execute the default operation software contained in ROM for baseline operation. Another method of prohibiting downloaded firmware from being executed is to send an "Accept Firmware Download" command immediately followed by a "Return to Primary Channel" command.

The "Load Firmware Segment" command is used to download the individual segments of a firmware package. All converters receiving this command, if in firmware reception mode, overwrite the appropriate segment of firmware by the received data. Before actually overwriting the code, the converter checks to see if the package number matches the commanded package number, and calculates the segment check pattern from the received data. If the check pattern is correct, the segment data is decrypted, the appropriate prior segment is overwritten with the new segment, and the appropriate bit in the firmware segment bit map is set.

The "Check/Execute Firmware" command is used to terminate the firmware download process. All converters receiving this command respond only if the package number matches the one sent originally in the "Accept Firmware Download" command, and if in firmware reception mode. If so, the converter checks to see if all of the necessary segments of firmware have been correctly received. If they have been, the package check pattern is calculated and tested. If the check pattern is bad, the converter ignores the command. If the check pattern is good, the converter permits execution of the newly downloaded package, switches back to the primary data stream, exits the firmware download mode, and clears its firmware download segment bit map.

The "Send Firmware Check Pattern" command is used to verify the firmware download process. A converter receiving this command responds only if it is not in firmware reception mode. In this event, the converter reports the check pattern of the appropriate segment or of the entire package. This verification scheme is only available on a two-way cable system.

Figure 6:
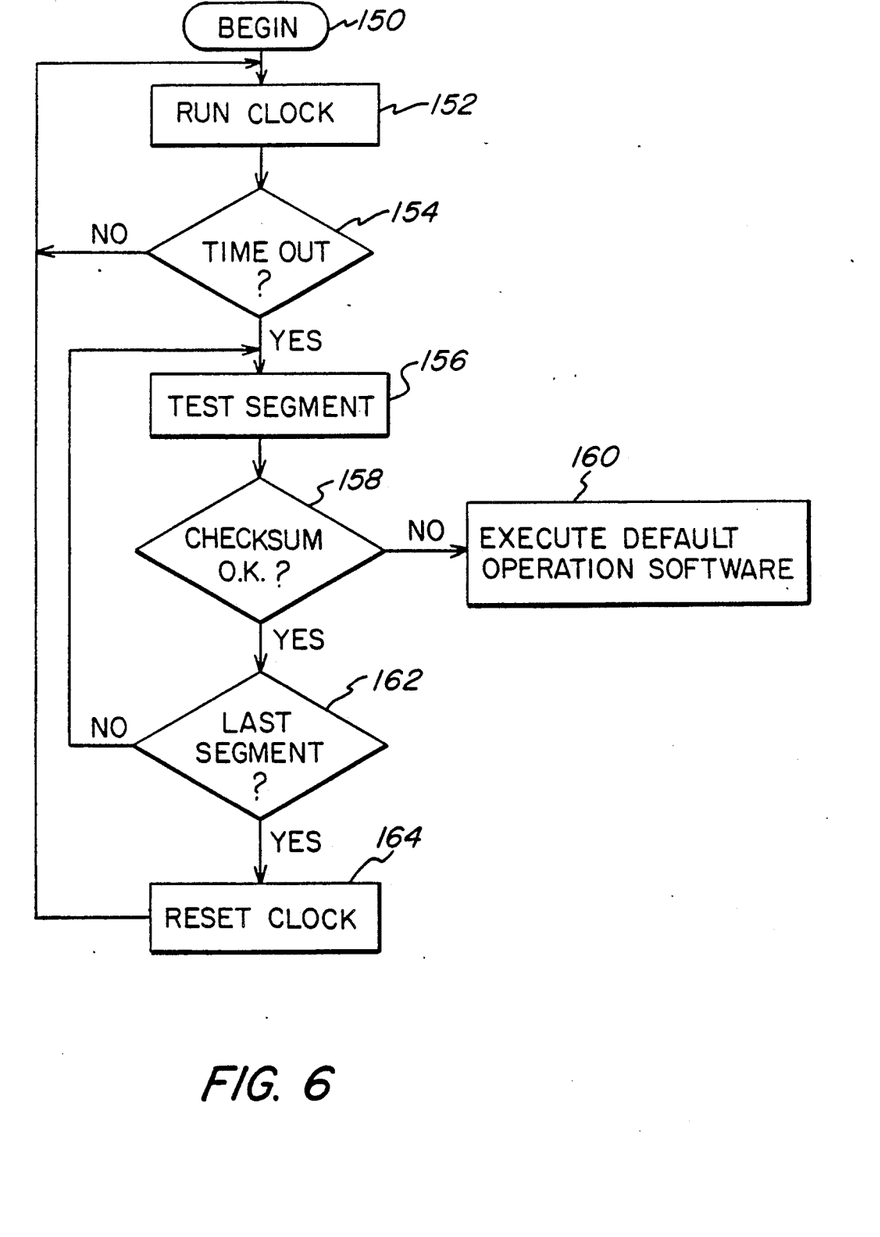
FIG. 6 is a flowchart illustrating the periodic reverification of downloaded software by a converter.

FIG. 6 illustrates a periodic self-check routine used by the converter to test the validity of downloaded firmware to ensure that it has not changed since the last download. This self-check is performed by the converter itself, and no addressable controller command is required to initiate it. The routine begins at box 150. At box 152, a clock runs to keep track of time. At box 154, a determination is made as to whether a predetermined time interval has passed. If not, the routine loops back to box 152 and the process continues until the time interval has run. Then, box 154 passes control to box 156 to commence the periodic self-check.

At box 156, the first segment of the firmware package is tested by computing its checksum. At box 158, a determination is made as to whether the checksum is the proper checksum for that segment. If not, control passes to box 160 and the default operation software is executed to return the converter to baseline operation. If the checksum for the segment is proper, control passes to box 162, which determines if the segment just tested is the last segment in the firmware package. If not, the routine loops back to box 156 so that all of the segments in the firmware package can be tested.

Once the last segment has been tested, control is passed from box 162 to box 164 where the clock is reset. Control then loops back to box 152 and the process continues, so that the self-check will be periodically performed at the time interval dictated by the time-out determination function at box 154.

It will now be appreciated that the present invention provides a method and apparatus for remotely modifying the functionality of a terminal, such as a cable television converter. Terminal functions are dictated by downloaded firmware. The firmware is transmitted in small segments to reduce the likelihood and severity of transmission errors, and to reduce the temporary buffering requirements within the terminal. Each section of a firmware package is transmitted with an identifier indicating which segment it is, and which firmware package it is part of. A multiplicity of firmware packages may be carried on a single system, with different terminals in the system accepting and executing different packages as specified by the system headend.

The firmware is stored at the terminal in nonvolatile memory, such as RAM with a battery backup. Various safeguards are provided to ensure that the firmware is accurately downloaded, and to frustrate the efforts of a software pirate attempting to infiltrate the system.

Although the present invention has been described in connection with a preferred embodiment, it will be appreciated that man modifications and adaptations may be made thereto without departing from the spirit and scope of the invention as set forth in the following claims.

What is claimed is:

1. A cable television converter with remotely modifiable functionality comprising:
   means for receiving firmware downloaded from a cable television headend;
   means coupled to said receiving means for storing said firmware;
   means for verifying the integrity of said firmware;
   processor means coupled to said storing means for accessing and executing said firmware to provide one or more converter functions dictated by the firmware;
   nonvolatile memory means coupled to said processor means for storing default operation software for said converter; and
   means responsive to said verifying means for causing said processor means to execute said default operation software instead of said firmware in the event the integrity of said firmware is not verified.

2. The converter of claim 1 further comprising:
   data receiving means for obtaining instructions downloaded from a cable television headend; and
   means for enabling downloaded firmware to be received and stored by the converter only in response to specific instructions received by said data receiving means.

3. The converter of claim 2 wherein said firmware receiving means and data receiving means comprise:
   a frequency agile data receiver; and
   means for selectively tuning said receiver to receive said instructions on a first channel and said firmware on a second channel.

4. The converter of claim 3 further comprising:
   timer means for returning said receiver to said first channel if it has been tuned to said second channel for a predetermined time period.

5. The converter of claim 4 wherein said predetermined time period is specified in instructions received on said first channel.

6. The converter of claim 5 wherein the length of said predetermined time period is dependent on an amount of firmware to be received.

7. The converter of claim 2 wherein said firmware is transmitted in an encrypted form, and said instructions contain a key for decrypting the firmware.

8. The converter of claim 2 wherein said firmware is received in a plurality of segments, and said instructions identify the number of segments to be received for a complete firmware download.

9. The converter of claim 8 further comprising:
   means for determining if all of said segments have been validly received; and
   means for receiving replacement segments if one or more segments of said firmware has not been validly received.

10. The converter of claim 8 further comprising:
    means for preventing the receipt of firmware if the number of segments identified by said instructions is greater than a predetermined limit.

11. The converter of claim 1 wherein said firmware implements a functional layout on a keyboard associated with said converter.

12. The converter of claim 1 wherein said firmware implements a feedback function to assist a user in operating the converter.

13. The converter of claim 1 wherein said firmware implements a control function for a video recorder coupled to the converter.

14. The converter of claim 1 wherein said firmware implements a communication protocol for the converter.

15. The converter of claim 1 wherein said firmware implements a descrambling technique for the converter.

16. The converter of claim 1 wherein said firmware implements an on-screen display to be provided by the converter to a television coupled thereto.

17. The converter of claim 1 wherein said firmware implements a user interface to services provided over a cable television network.

18. The converter of claim 1 wherein said firmware implements an electronic mail capability to be provided over a cable television network.

19. The converter of claim 1 wherein said firmware implements a viewership monitoring function.

20. A cable television converter with remotely modifiable functionality comprising:
   frequency agile data receiver means for receipt of addressable data from a cable television headend on a first channel and for receipt of firmware from said headend on a second channel;
   means for tuning said receiver means to switch to said second channel for receipt of firmware in response to instructions contained in addressable data received on said first channel;
   memory means for storing firmware received on said second channel; and
   processor means coupled to said memory means for accessing and executing firmware received from said headend to provide at least one converter function.

21. The converter of claim 20 further comprising:
   means for verifying the integrity of firmware received on said second channel; and
   means for causing said processor means to execute default operation software instead of said firmware in the event the integrity of said firmware is not verified.

22. The converter of claim 20 further comprising:
   timer means for returning said receiver to said first channel if it has been tuned to said second channel for a predetermined time period.

23. The converter of claim 22 wherein said predetermined time period is specified in instructions contained in addressable data received on said first channel.

24. The converter of claim 23 wherein the length of said predetermined time period is dependent on the amount of firmware to be received.

25. The converter of claim 20 wherein said firmware implements a functional layout on a keyboard associated with said converter.

26. The converter of claim 20 wherein said firmware implements a feedback function to assist a user in operating the converter.

27. The converter of claim 20 wherein said firmware implements a control function for a video recorder coupled to the converter.

28. The converter of claim 20 wherein said firmware implements a communication protocol for the converter.

29. The converter of claim 20 wherein said firmware implements a descrambling technique for the converter.

30. The converter of claim 20 wherein said firmware implements an on-screen display to be provided by the converter to a television coupled thereto.

31. The converter of claim 20 wherein said firmware implements a user interface to services provided over a cable television network.

32. The converter of claim 20 wherein said firmware implements an electronic mail capability to be provided over a cable television network.

33. The converter of claim 20 wherein said firmware implements a viewership monitoring function.

34. Cable television headend apparatus for downloading firmware to an addressable remotely modifiable cable television converter, comprising:
   means for transmitting addressable converter data on a first data channel of a cable television network;
   means for transmitting firmware on a second data channel of said cable television network;
   means for providing an address in said addressable converter data specific to a particular converter coupled to the network, said address enabling specific data to be received by said converter on said first data channel; and
   means for providing instructions in said specific data, said instructions causing said converter to switch to said second channel to receive firmware.

35. The apparatus of claim 34 further comprising:
   means for verifying that firmware downloaded to said converter has been successfully received by the converter.

36. The apparatus of claim 34 further comprising:
   billing means for maintaining a record of functions said converter is authorized to have, and for assigning a particular firmware package to be downloaded to said converter on the basis of the authorized functions.

37. A method for providing a cable television converter with functions dictated by downloaded firmware, comprising the steps of:
   receiving converter control data from a remote headend location;
   capturing a designated firmware package, from a set of different firmware packages dictating various converter functions and transmitted from said remote headend location, in response to instructions contained in said converter control data;
   storing the designated firmware package in a memory provided in said converter; and
   executing said firmware to provide at least one converter function dictated thereby.

38. The method of claim 37 wherein the firmware packages are transmitted in encrypted form, said method comprising the further step of:
   decrypting the captured firmware using a key contained in said converter control data.

39. The method of claim 37 wherein said converter control data is received on a first channel of a cable television network and said firmware packages are captured from a second channel of the cable television network.

40. The method of claim 39 comprising the further steps of:
   monitoring said first channel to receive converter control data;
   switching to said second channel to capture firmware upon receipt of appropriate instructions on said first channel; and
   switching back to said first channel after said firmware is captured.

41. The method of claim 40 comprising the further step of:
   switching back to said first channel from said second channel upon the expiration of a predetermined time period, if the firmware has not been captured within said time period.

42. The method of claim 41 comprising the further step of:
   deriving said time period from converter control data received on said first channel.

43. The method of claim 42 wherein the length of the time period is dependent on the amount of firmware to be captured.

44. A remotely modifiable user terminal comprising:

means for receiving a plurality of cyclically transmitted firmware segments together comprising a firmware package;

means coupled to said receiving means for verifying each segment upon receipt thereof;

means responsive to said verifying means for storing each verified segment;

means for determining if a complete firmware package has been stored in said storing means at the completion of a firmware transmission cycle;

means responsive to said determining means for continuing to receive, verify, and store transmitted firmware segments during a subsequent firmware transmission cycle if said determining means finds that a complete firmware package has not been stored; and means for terminating the reception of firmware segments upon a finding by said determining means that a complete firmware package has been stored.

45. The terminal of claim 44 further comprising:

means for precluding the execution of firmware segments until a complete firmware package has been stored.

46. The terminal of claim 44 wherein said verifying means tests a checksum for each firmware segment, said terminal further comprising:

means for maintaining a record of the proper checksum for each segment; and means for periodically retesting said checksums after a complete firmware package has been stored.

47. The terminal of claim 46 further comprising:

means for storing default operation software for said terminal; and means for executing said default operation software if said checksums are not verified upon retesting.

48. The terminal of claim 44 further comprising:

means for validating the complete firmware package after it has been stored.

49. The terminal of claim 48 further comprising:

means for storing default operation software for said terminal; and means for executing said default operation software if said validating means determines that the complete firmware package is not valid.

50. The terminal of claim 44 further comprising:

timer means for terminating the reception of firmware segments after a predetermined time period.

51. The terminal of claim 50 further comprising:

means for storing default operation software for said terminal; and means for executing said default operation software if said timer means terminates the reception of firmware segments.

52. The terminal of claim 44 wherein said terminal is a cable television converter, and the execution of said firmware provides at least one converter function.

53. The terminal of claim 52 wherein a complete firmware package includes a plurality of modules, said terminal further comprising:

means for precluding the execution of downloaded firmware if fewer than all of the modules are available for execution.

* * * * *